United States Patent
Deng

[19]

[11] Patent Number: 5,892,797
[45] Date of Patent: Apr. 6, 1999

[54] SYSTEM AND METHOD FOR RECOVERING DATA ENCODED USING MANCHESTER CODE AND OTHER BI-PHASE LEVEL CODES

[75] Inventor: Jay Jie Deng, Union City, Calif.

[73] Assignee: Jay Deng, San Jose, Calif.

[21] Appl. No.: 892,123

[22] Filed: Jul. 15, 1997

Related U.S. Application Data

[60] Provisional application No. 60/021,462 Jul. 17, 1996.

[51] Int. Cl.$^6$ .............................. H04L 7/42; H04L 27/10; H04L 27/22; H03D 3/22
[52] U.S. Cl. .......................... 375/361; 375/282; 375/333; 375/279; 375/329; 375/359; 341/70; 341/68; 329/304; 329/310
[58] Field of Search .................................... 375/282, 333, 375/361, 328, 329, 331, 279–284; 341/71, 70; 360/44; 329/304, 305, 306, 310

[56] References Cited

U.S. PATENT DOCUMENTS

| | | | |
|---|---|---|---|
| 4,017,803 | 4/1977 | Baker | 329/104 |
| 4,730,347 | 3/1988 | Paul | 375/371 |
| 5,127,023 | 6/1992 | Tash et al. | 375/282 |
| 5,224,126 | 6/1993 | Myers et al. | 375/110 |
| 5,574,399 | 11/1996 | Oura et al. | 329/304 |
| 5,636,248 | 6/1997 | Tash et al. | 375/282 |

*Primary Examiner*—Stephen Chin
*Assistant Examiner*—Michael W. Maddox
*Attorney, Agent, or Firm*—Gary S. Williams; Flehr Hohbach Test Albritton & Herbert LLP

[57] ABSTRACT

A data and clock recovery circuit includes a front end circuit for receiving a data signal encoded with a Manchester or other bi-phase level code having a sequence of bit frames, and for outputting a recovered data signal and a recovered clock signal in accordance with transitions in the data signal that overlap with a window signal. A window generation circuit generates the window signal in accordance with a delay control signal, and includes circuitry that delays and transforms the recovered clock signal into the window signal. A delay control circuit generates and adjusts the delay control signal. A phase comparison circuit compares the recovered clock signal with leading and lagging portions of the window signal, and generates signals that adjust the delay control signal when the recovered clock signal overlaps with either of the leading and lagging portions of the signal. The delay control signal is adjusted so as to re-position the window signal so that the recovered clock signal is positioned between the leading and lagging portions of the window signal.

8 Claims, 11 Drawing Sheets

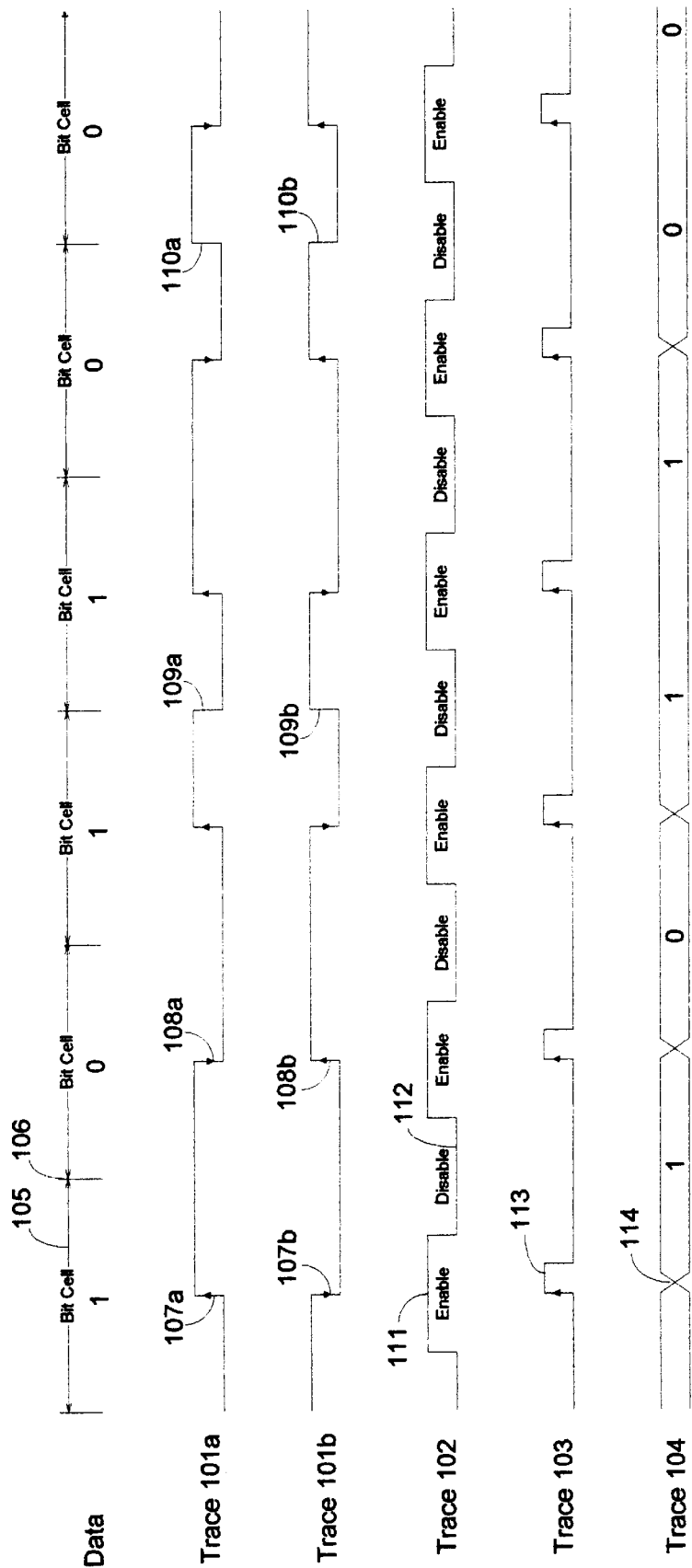
FIG. 1 Timing Diagram of Manchester Code Clock and Data Recovery

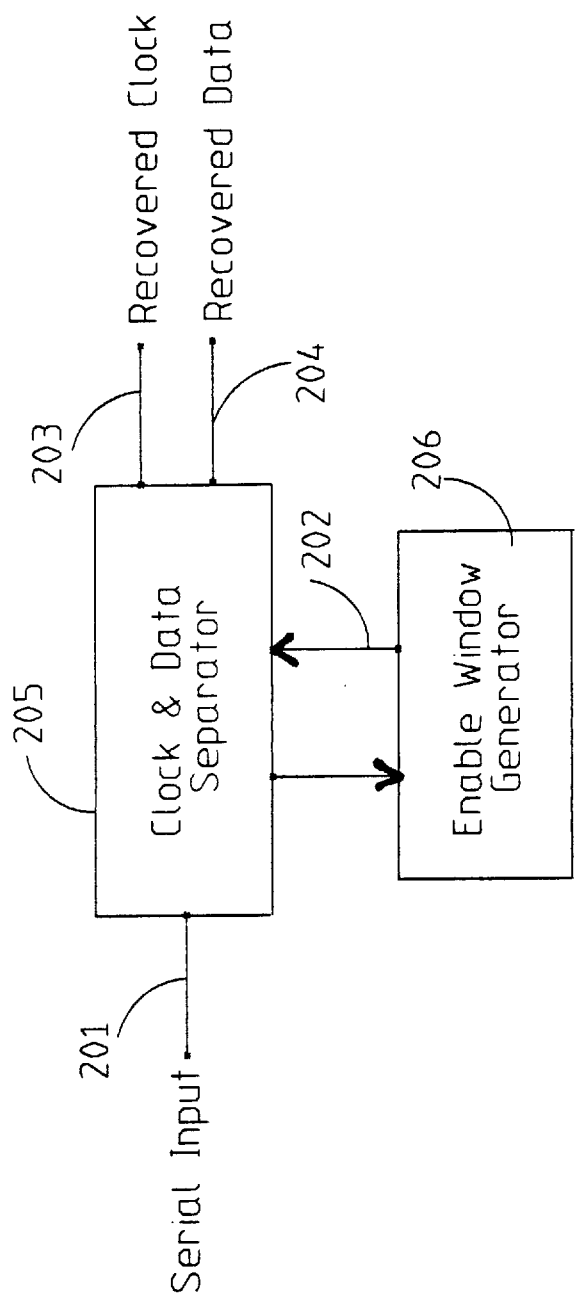
FIG. 2   Clock and Data Recovery System For Manchester and Bi-Phase Level Codes

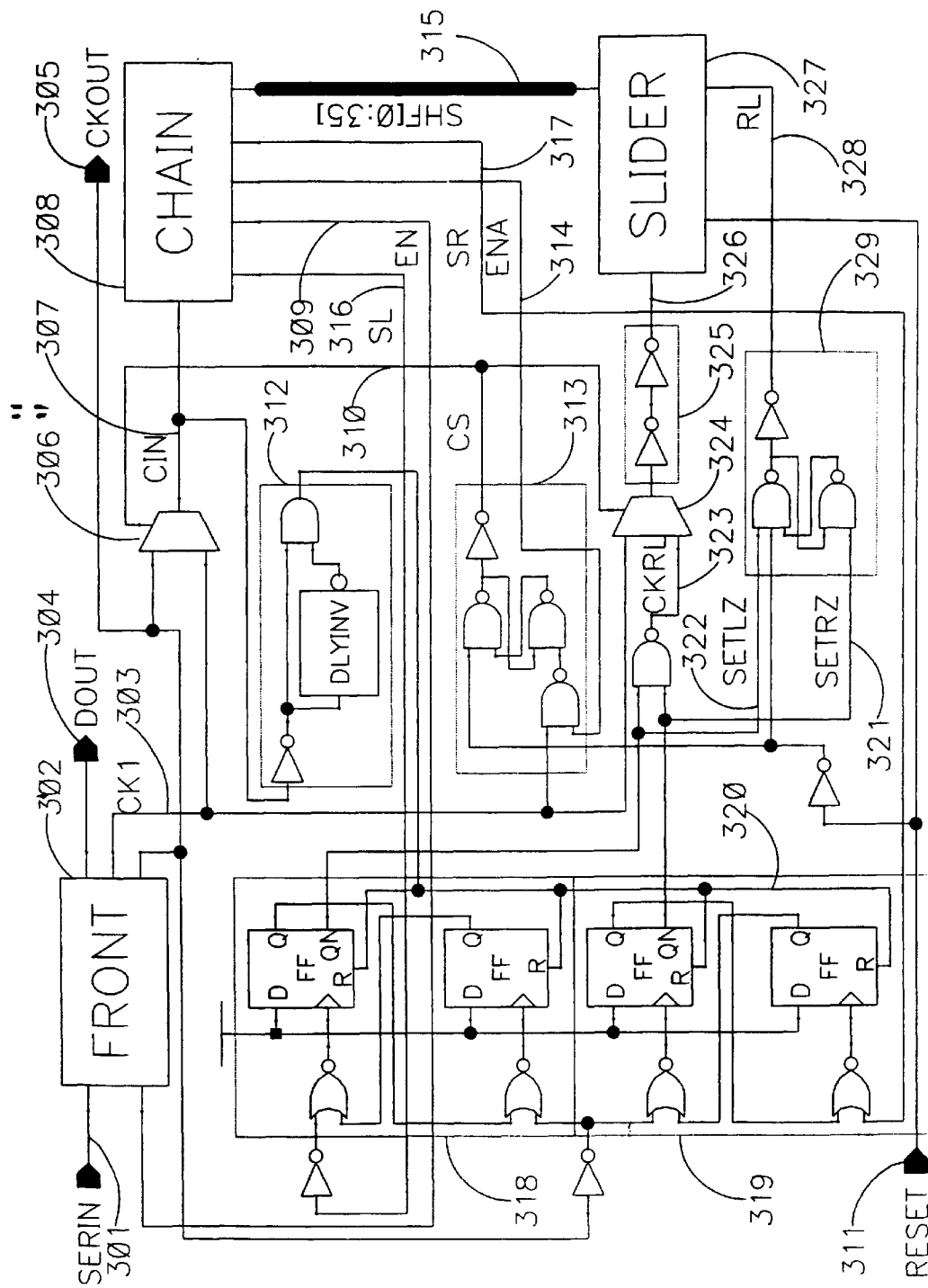
FIG. 3. TOP

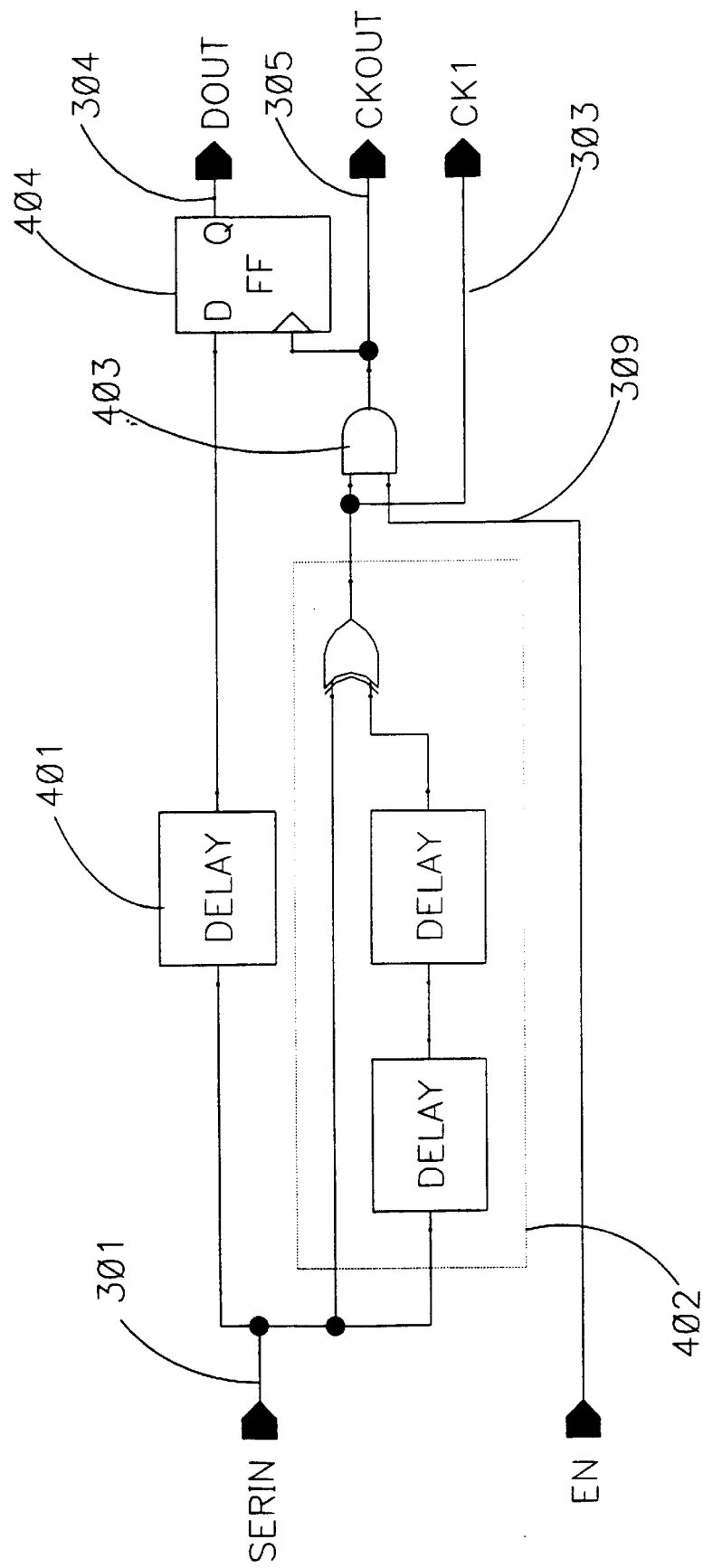
FIG. 4. FRONT

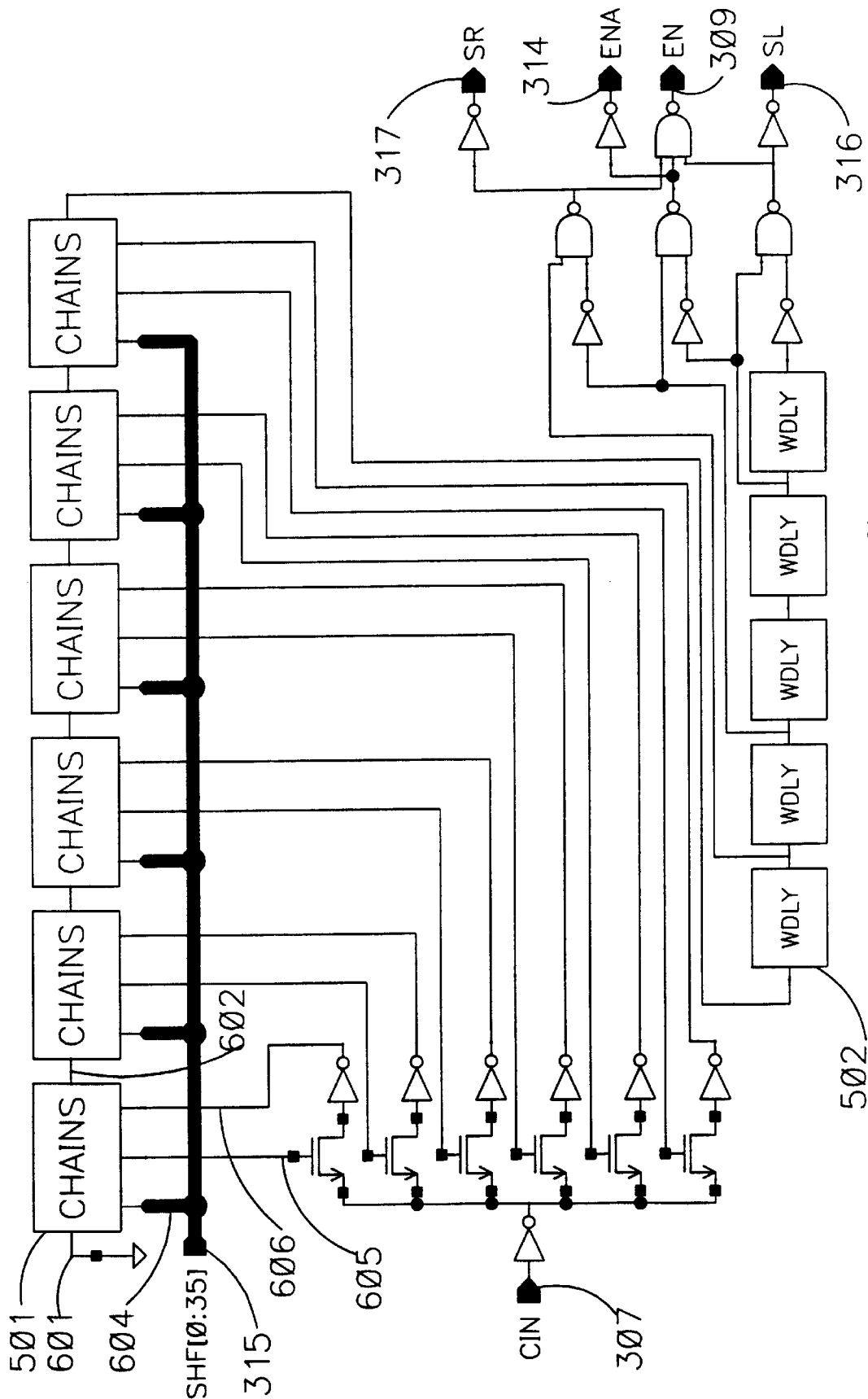
FIG. 5. CHAIN

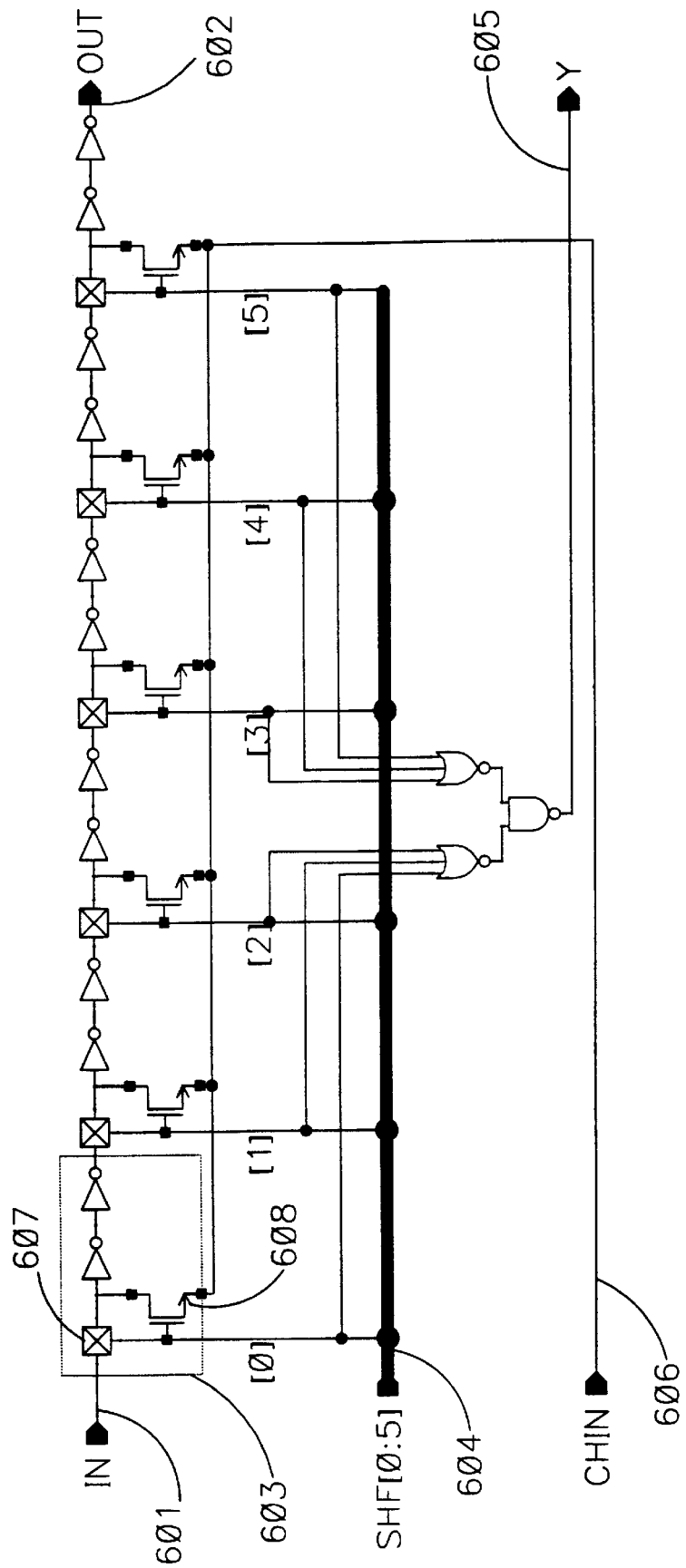
FIG. 6. CHAINS

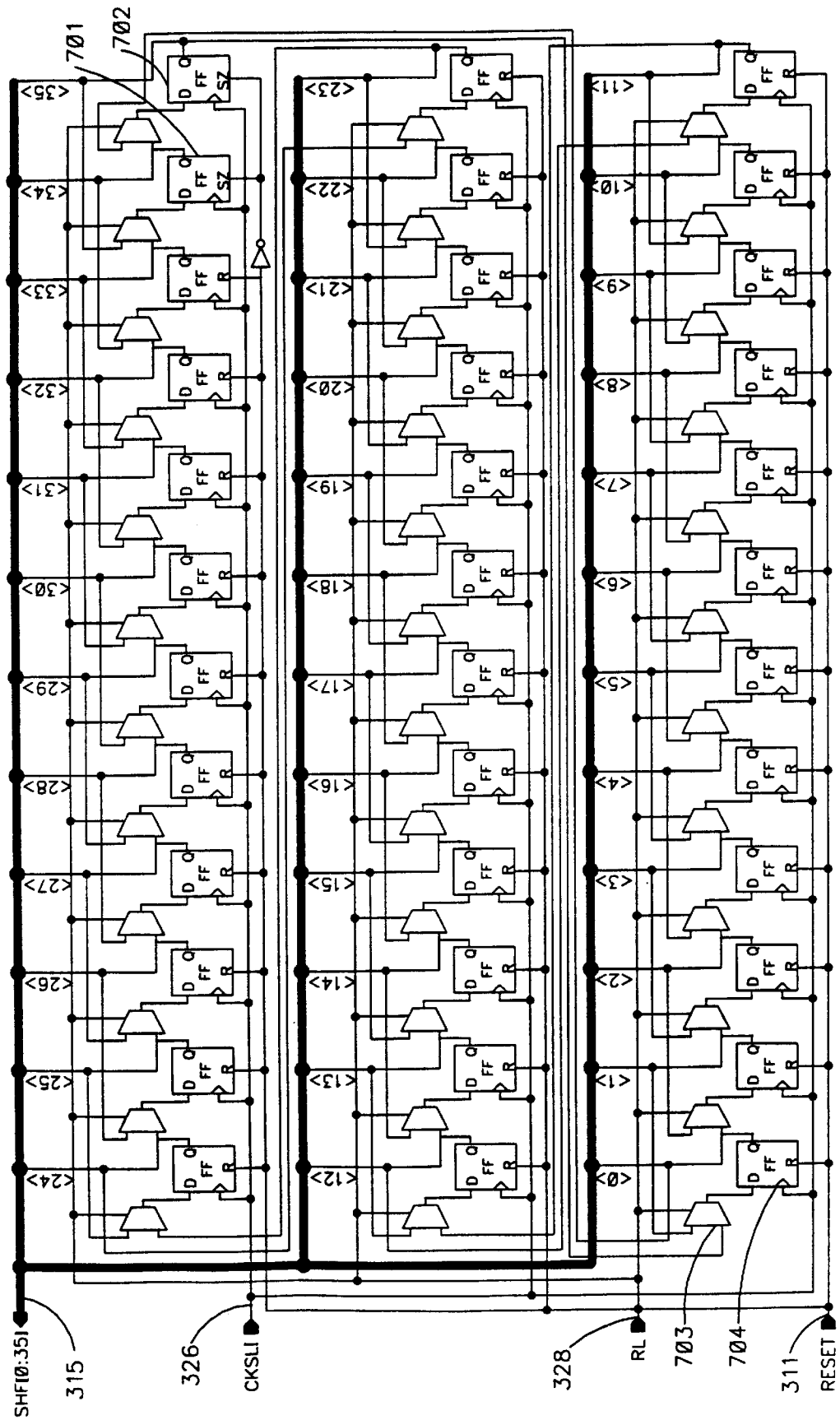
FIG. 7. SLIDER

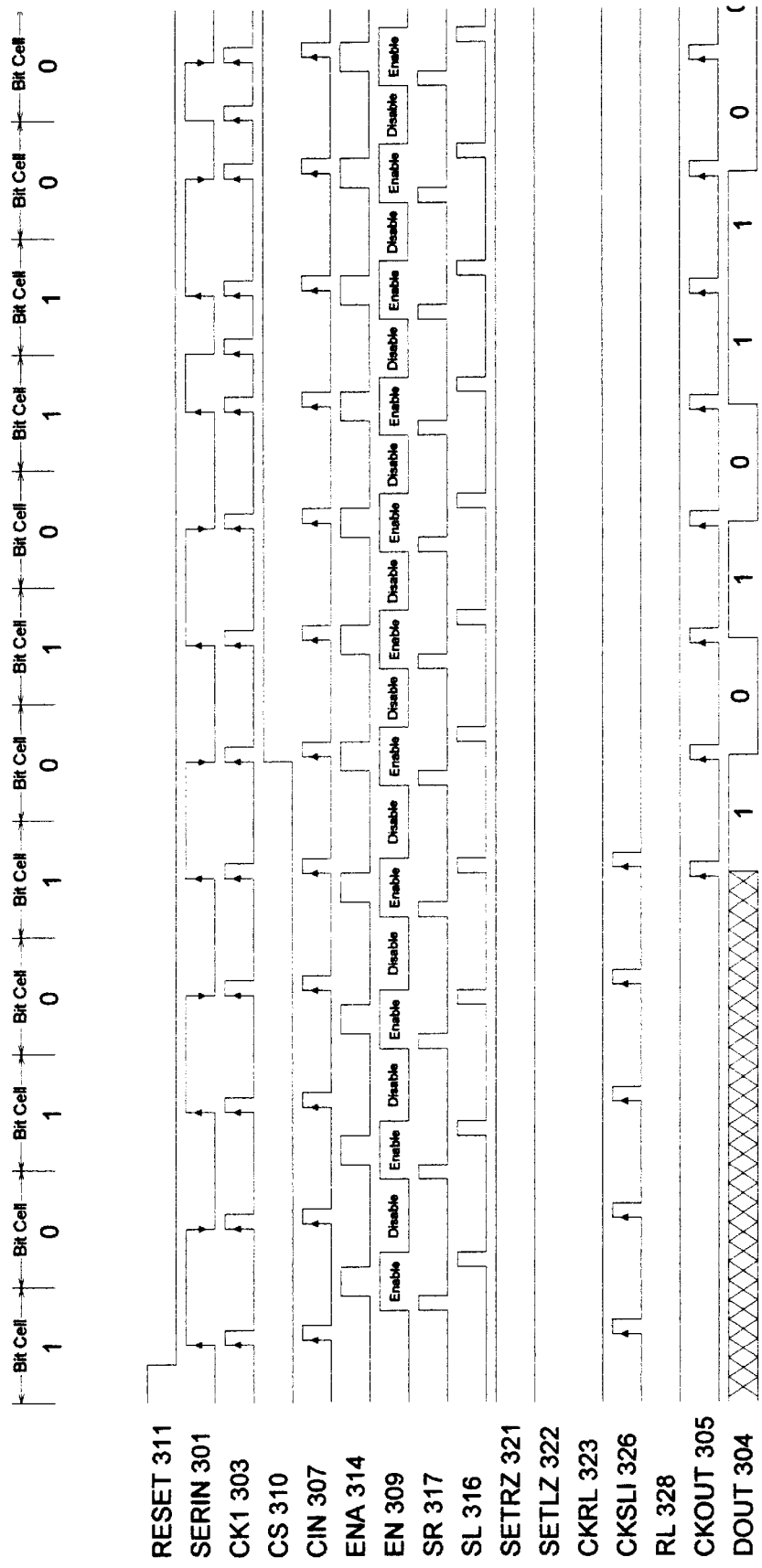
FIG. 8 Timing Diagram of Manchester Code Clock and Data Recovery in Initialization

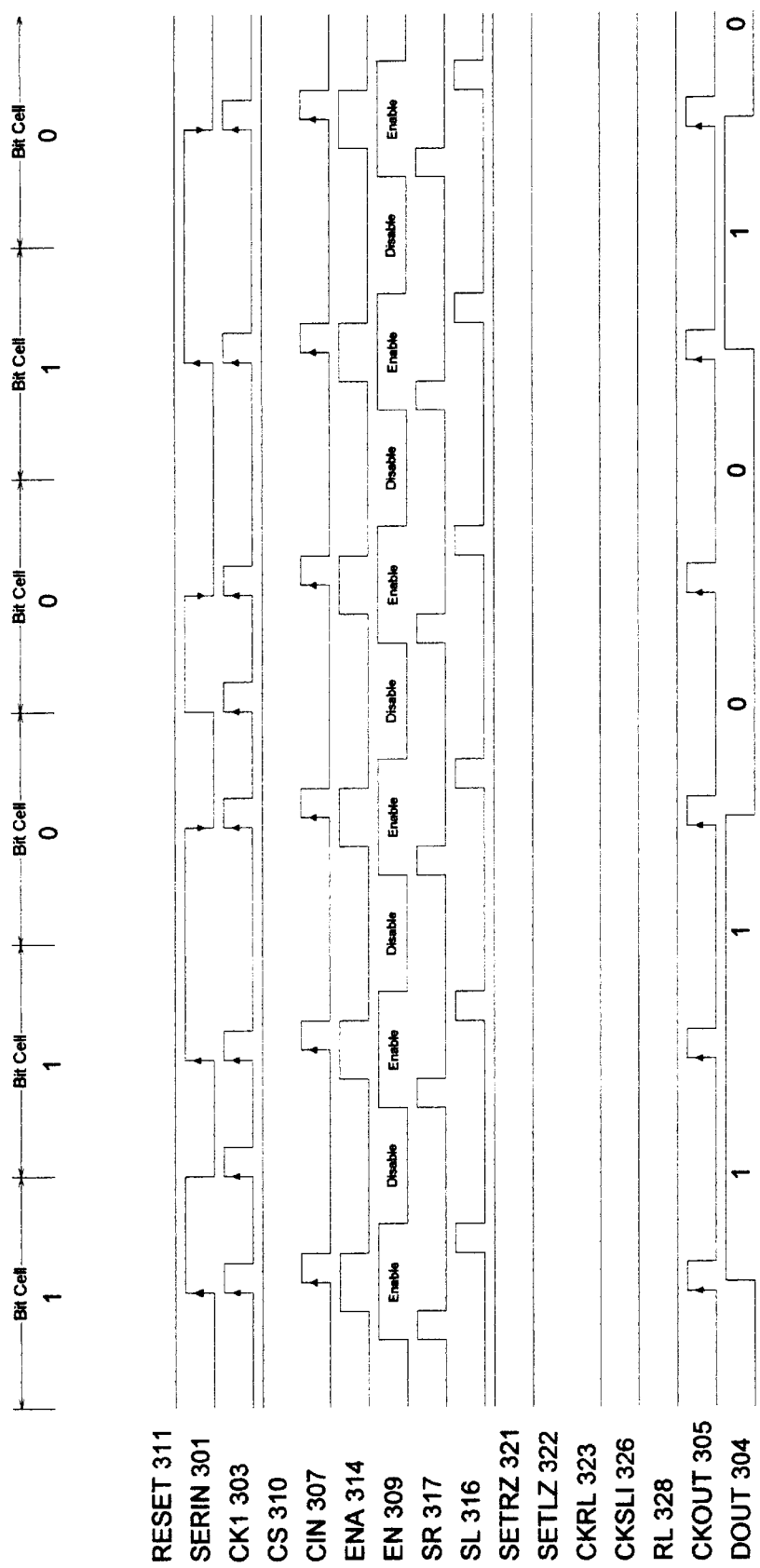
FIG. 9 Timing Diagram of Manchester Code Clock and Data Recovery in Normal Operation

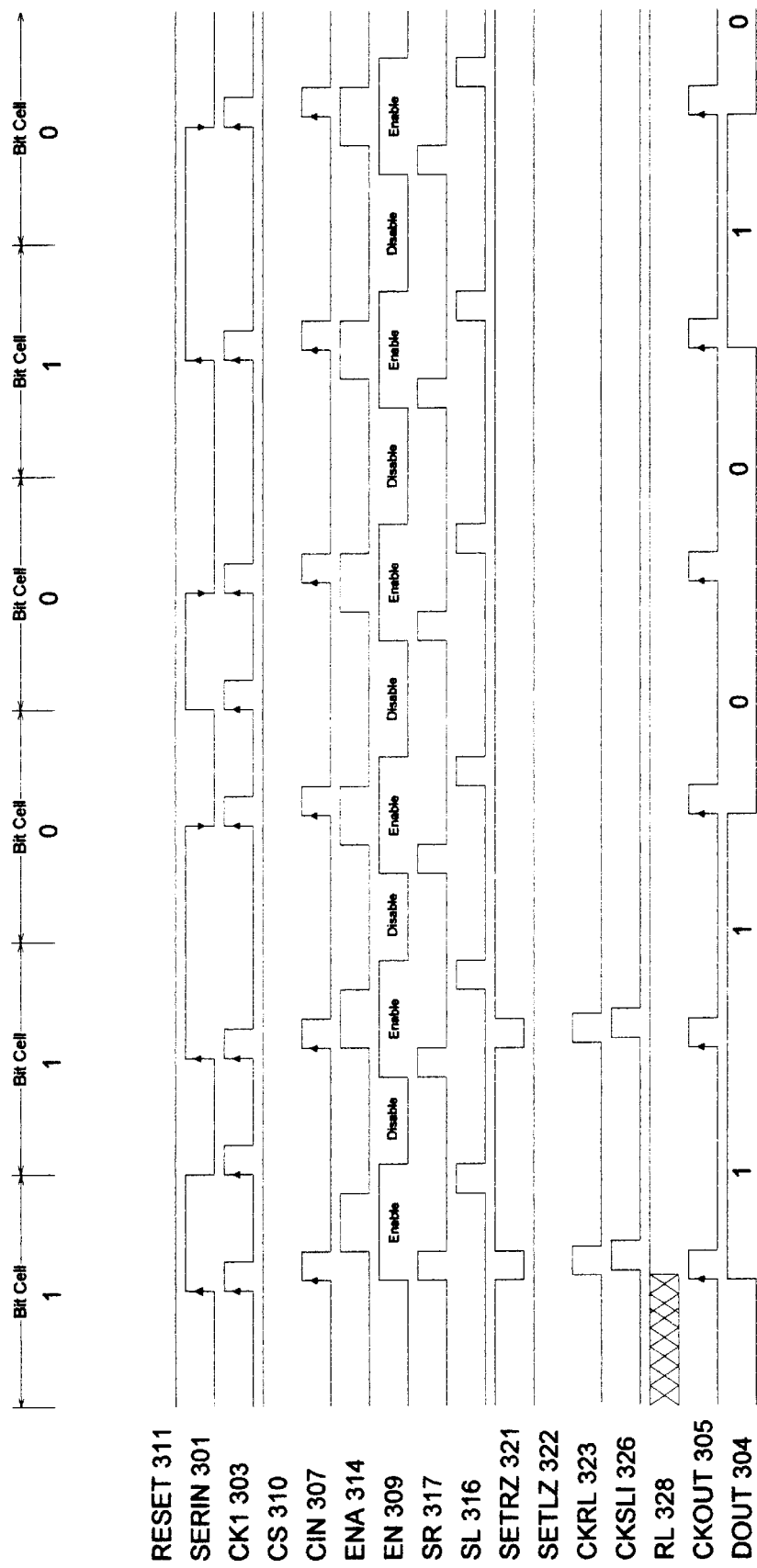
FIG. 10 Timing Diagram of Manchester Code Clock and Data Recovery with Enabling Window Shifting Left

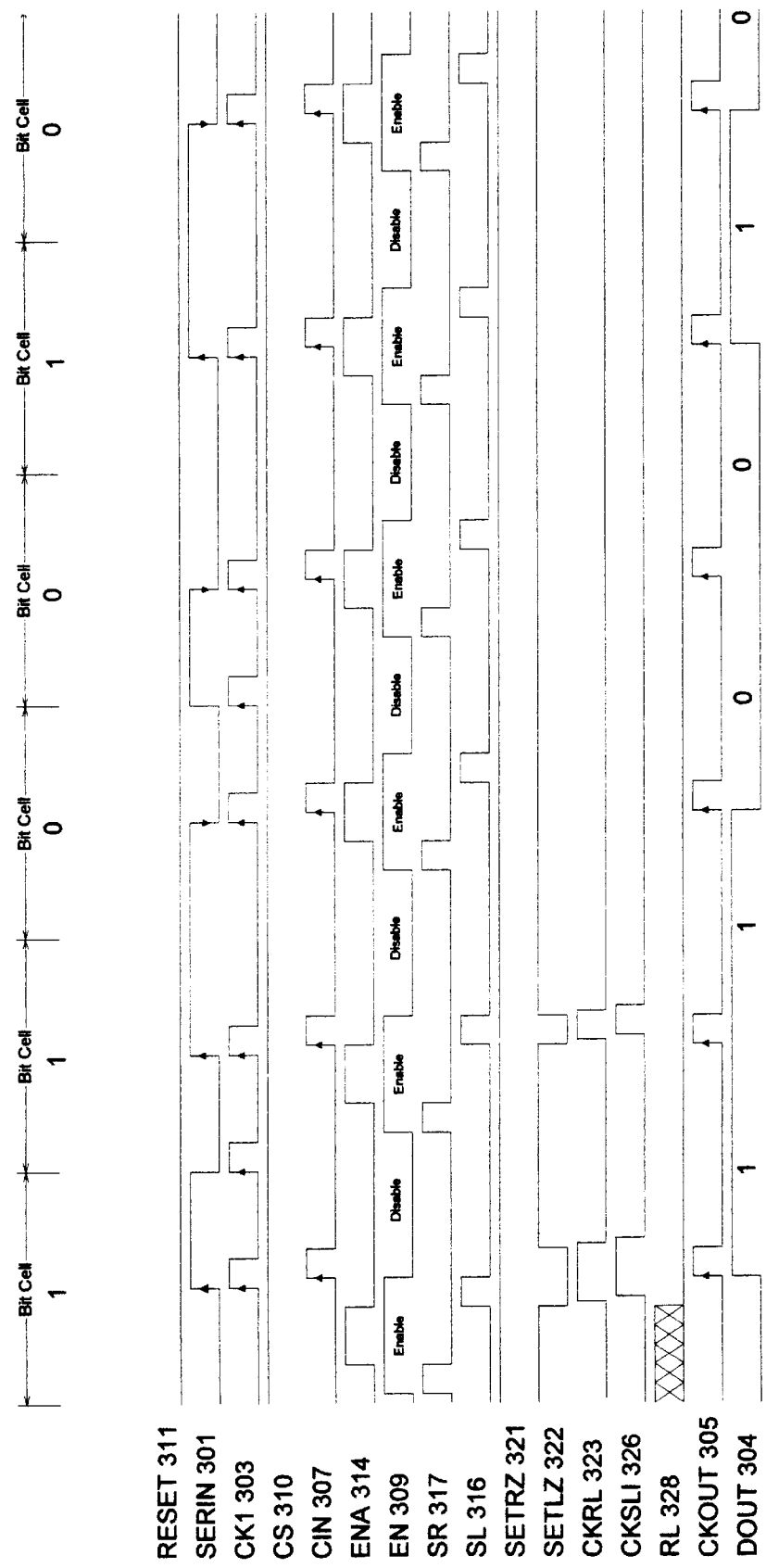
FIG. 11 Timing Diagram of Manchester Code Clock and Data Recovery with Enabling Window Shifting Right

SYSTEM AND METHOD FOR RECOVERING DATA ENCODED USING MANCHESTER CODE AND OTHER BI-PHASE LEVEL CODES

This application claims priority from U.S. provisional application 60/021,462, filed Jul. 17, 1996.

The present invention relates generally to recovering clock and data signals from data encoded using Manchester or other bi-phase level codes, and particularly to a clock and data recovery system and method that avoids the use of phase-locked loops.

BACKGROUND OF THE INVENTION

The traditional way to recover a clock signal from a serial data bit stream is for the receiving system or circuit to generate a clock signal. The clock signal is synchronized to the incoming serial data bit stream, usually using a phase-locked loop or delay-locked loop. The receiving system's generated clock signals are synchronized with transitions in the incoming serial data bit stream.

Unlike the previously known methods, the present invention treats a subset of the transitions in the incoming Manchester or other bi-phase level encoded serial data bit stream as the clock signal itself, using a filter to filter out unwanted transitions in the received signal, retaining only the "informational" transitions in the received signal. The recovered clock is obtained by amplifying and reshaping the informational transitions. The circuit of the present invention does not use any analog or digital phase-locked loops or delay-locked loops. When using the same integrated circuit fabrication technology, circuitry using the present invention achieves similar speed performance as a typical phase-locked loop or delay-locked loop.

Advantages of the present invention are:
  much higher jitter tolerance on the incoming signal than is practical using phase-locked loop technology. Jitter tolerance is vital for a clock and data recovery system. It is the most desirable characteristic of a clock and data recovery system.
  The present invention can be implemented using solely digital circuitry, which avoids the difficulties of mixing analog and digital circuits on a single semiconductor integrated circuit chip.
  Avoiding the use of phase-locked or delay-locked loops avoids the difficulties normally associated with providing a stable control system.
  The present invention uses much simpler circuitry than clock and data recovery circuitry utilizing phase-locked and delay-locked loop, which results in higher integration levels on a single semiconductor integrated circuit chip. A very large number of such clock and data recovery circuit blocks can be implemented on a single semiconductor integrated circuit chip. This is important because it enables integration of some types of systems on a single semiconductor integrated circuit chip which is not attainable using traditional clock and data recovery circuits.
  The present invention uses much less power than clock and data recovery circuitry utilizing phase-locked and delay-locked loop.

SUMMARY OF THE INVENTION

A data and clock recovery circuit includes a front end circuit for receiving a data signal encoded with a Manchester or other bi-phase level code having a sequence of bit frames, and for outputting a recovered data signal and a recovered clock signal in accordance with transitions in the data signal that overlap with a window signal. A window generation circuit generates the window signal in accordance with a delay control signal, and includes circuitry that delays and transforms the recovered clock signal into the window signal. A delay control circuit generates and adjusts the delay control signal.

A phase comparison circuit compares the recovered clock signal with leading and lagging portions of the window signal, and generates signals that adjust the delay control signal when the recovered clock signal overlaps with either of the leading and lagging portions of the signal. The delay control signal is adjusted so as to re-position the window signal so that the recovered clock signal is positioned between the leading and lagging portions of the window signal.

In a preferred embodiment, the received data signal is formatted as a sequence of data packets, each data packet beginning with a predefined synchronization data pattern. The data and clock recovery circuit has a prelock mode of operation and a lock mode of operation. In the prelock mode, the delay control circuit initially generates the delay control signal with a predefined initial delay control signal value and then, in conjunction with the phase comparison circuit, monotonically adjusts the delay control signal value until the recovered clock signal is positioned between the leading and lagging portions of the window signal, at which point the data and clock recovery circuit changes to the lock mode of operation.

BRIEF DESCRIPTION OF THE DRAWINGS

Additional objects and features of the invention will be more readily apparent from the following detailed description and appended claims when taken in conjunction with the drawings, in which:

FIG. 1 is a timing diagram for explaining how a clock and data recovery system should work in order to recover a Manchester encoded serial data stream.

FIG. 2 is a block diagram of a clock and data recovery system for recovering the clock and data signals in a Manchester encoded serial data stream.

FIG. 3 is a logic circuit and block diagram of a clock and data recovery system for recovering the clock and data signals in a Manchester encoded serial data stream.

FIG. 4 is a logic circuit diagram of a subcircuit identified as the FRONT circuit block in FIG. 3.

FIG. 5 is a block diagram of a subcircuit identified as the CHAIN circuit block in FIG. 3.

FIG. 6 is a logic circuit diagram of a subcircuit identified as the CHAIN S circuit block in FIG. 5.

FIG. 7 is a logic circuit diagram of a subcircuit identified as the SLIDER circuit block in FIG. 3.

FIG. 8 is a timing diagram showing operation of the circuit of FIG. 3 during initialization of the circuit, such as when the circuit receives the beginning of a data packet.

FIG. 9 is a timing diagram showing operation of the circuit of FIG. 3 during normal operation of the circuit.

FIG. 10 is a timing diagram showing operation of the circuit of FIG. 3 when the data recovery window is being shifted to successively earlier positions relative to the bit frames in the incoming data stream.

FIG. 11 is a timing diagram showing operation of the circuit of FIG. 3 when the data recovery window is being shifted to successively later positions relative to the bit frames in the incoming data stream.

DESCRIPTION OF THE PREFERRED EMBODIMENT

Referring to FIG. 1, trace 101a represents a Manchester encoded serial data stream of having the bit pattern . . . 1 0 1 1 0 0 . . . and trace 101b represents the same serial data stream encoded using a bi-phase level code. A bit cell 105, also known as a bit frame, is defined as the time interval in which one bit is transmitted. The Manchester code uses a sequence of "Low-High" to represent a data bit value of 1 and a sequence of "High-Low" to represent a data bit value of 0. The bi-phase level code in trace 101b uses a sequence of "High-Low" to represent a 1 and a sequence of "Low-High" to represent a 0.

In the Manchester code (trace 101a), a rising informational transition 107a in the middle of a bit cell represents a 1 and a falling informational transition 108a in the middle of a bit cell represents a 0. A falling returning transition 109a will occur at the bit cell boundary 106 if more than one consecutive 1s are transmitted. A rising returning transition 110a will occur at the bit cell boundary 106 if more than one consecutive 0s are transmitted. In the bi-phase level code (trace 101b), a falling informational transition 107b in the middle of a bit cell represents a 1 and a rising informational transition 108b in the middle of a bit cell represents a 0. A rising returning transition 109b will occur at the bit cell boundary 106 if more than one consecutive 1s are transmitted. A falling returning transition 110b will occur at the bit cell boundary 106 if more than one consecutive 0s are transmitted.

The present invention employs an enable window 111 to pass through the informational transitions and a disable window 112 to filter out non-informational returning transitions in the data signal.

Trace 102 shows a sequence of these enable and disable windows. The enable windows are positioned so that the informational transition around the center of every bit cell falls within the enable windows. The disable windows are centered around every bit cell's boundaries, so that the returning transitions are filtered out.

An informational transition passing through an enable window is directly converted into a recovered clock pulse 113. A sequence of such clock pulses form the recovered clock trace 103. These clock pulses are evenly spaced and represent exactly the transmitting clock's frequency. Hence this clock signal is the desired recovered clock. Meanwhile this recovered clock can be used to sample the incoming serial data stream represented by either trace 101a or trace 101b. The sampled data is the recovered data which is shown in trace 104. The recovered data changes when the next bit is not the same as the previous bit.

FIG.2 shows a generic form of clock and data recovery system for Manchester and the other bi-phase level code data streams, in accordance with the present invention. A serial data stream input 201 comes from a remote transmitting site. An enable window generator 206 generates enable windows. The enable windows' center is aligned to the center of the serial data input bit cell by referencing the position of the informational transitions provided by the clock and data separator 205. The enable signal 202 is sent back to the clock and data separator 205. The recovered clock is output on line 203 and the recovered data is output on line 204.

Digital Circuit Implementation

FIG. 3 provides a top level view of the entire clock and data recovery circuit. Referring to FIGS. 3 and 8, in the case of Manchester code, the serial input data stream is received at node SERIN 301.

In a preferred embodiment, the received data signal is formatted as a sequence of data packets, each data packet beginning with a predefined synchronization data pattern. The clock and data recovery circuit has a prelock mode of operation and a lock mode of operation. In the prelock mode, a delay control circuit initially generates a delay control signal with a predefined initial delay control signal value and then, in conjunction with a phase comparison circuit 320, monotonically adjusts the delay control signal value until the recovered clock signal is positioned between the leading and lagging portions of the window signal, at which point the data and clock recovery circuit changes to the lock mode of operation. The clock and data recovery circuit is placed in the prelock mode whenever a Reset signal is received. In the preferred embodiment, it is presumed that a Reset signal is generated by an external circuit prior to the receipt of each new data packet.

Any transition on node SERIN 301 generates a pulse on node CK1 303. Initially, after the occurrence of a Reset signal that puts the clock and data recover circuit in the prelock mode of operation, the delay chain input selection MUX 306 is set to pass the CK1 signal on node 303 through to node CIN 307. The signal on node CIN 307 enters into the Chain circuit block 308, which generates a center enabling window on node ENA 314, an enabling window on node EN 309, a shifting right window on node SR 317 and a shifting left window on node SL 316. The enabling window on node EN 309 is used to pass the needed informational transitions on node SERIN 301. Unwanted transitions on node SERIN 301 are filtered out by the disabling window on node EN 309.

When input serial data on node SERIN 301 contains jitter or the physical environment such as supply voltage or temperature changes, the center of the enabling window on node 309 drifts from the informational transitions on node SERIN 301. In order to detect and correct these drifts, shifting left (SL) and shifting right (SR) windows are used.

In the case of the other bi-phase level code, where a 1 is represented by a sequence of a "high-low" and a 0 is represented by a sequence of a "low-high", everything is the same as above except that the data output on node DOUT 304 is inverted.

Front Circuit Block

Referring to FIGS. 3, 4 and 9, the input nodes of the Front Circuit 302 are SERIN 301 and EN 309 and the output nodes are CK1 303, DOUT 304 and CKOUT 305.

For every transition on node SERIN 301, the transition detector 402 produces a positive pulse on node CK1 303. The transition detector 402 consists of two delay elements in series and a XOR gate. An enabling window signal is received on node EN 309, which is coupled to one input of the AND gate 403. The other input of the AND gate 403 is tied to node CK1 303. For positive pulses on node CK1 303, only those coincident with the enabling windows can get through the AND gate 403 to form positive pulses on node CKOUT 305. Any pulses on node CK1 303 falling outside the enabling windows are filtered out by the AND gate 403, and therefore those pulses never reach the node CKOUT 305.

A D-type flip-flop is used to capture the data. The flip-flop 404 is clocked by node CKOUT 305. In order to guarantee enough hold time for the flip-flop 404, a delay element 401 is inserted between the node SERIN 301 and the flip-flop's D input. The recovered data is obtained from the flip-flop's QN output which is node DOUT 304.

Chain Circuit Block

Referring to FIGS. 3, 5, 6, 8 and 9, the Chain circuit block 308, which is a tunable delay circuit, has an input pin connected to node CIN 307 and an input bus connected to bus SHF[0:35] 315. It also has four output pins. They are connected separately to node ENA 314, node EN 309, node SR 317 and node SL 316.

The Chain circuit block 308 is constructed by connecting several sub-chain circuit blocks 501 in series. Furthermore, several window delay elements 502 are also serially connected to the output of the last of the sub-chain circuit blocks. In a preferred embodiment, each of the window delay elements 502 shown in FIG. 5 consists of an even number of inverters. Other types of delay elements could be used in other implementations.

Each sub-chain circuit block 501 has several chain delay elements in series. In a preferred implementation, shown in FIG. 6, the chain delay element 603 consists of an even number of inverters connected in series. A transmission gate 607 is inserted before each inverter's input. Each transmission gate 607 is enabled by a low signal (corresponding to a 0 value) and is disabled by a high (or 1) signal value. More particularly, each transmission gate 607 is controlled by a corresponding bus tap SHF[x] of the input bus SHF[0:5] 604. The control signals on input bus SHF[0:5] 604 may have one or two bits high and the rest bits are low, or all bits are low. More particularly, only two bits of the thirty-six bits on the SHF[0:35] bus signal are high at any one time, and the rest are low.

When two of the bits in the input bus SHF[0:5] 604 are high, the transmission gates 607 in the chain delay elements corresponding to these two bits are turned off and the passing transistors 608 of these two chain delay elements are turned on. The input signal on node CHIN 606 is inserted into the delay chain by the enabled passing transistors. Effectively, the input signal is inserted just before the right one of the two enabled delay chain elements, because the transmission gate 607 after the left one of the two enabled delay chain elements is turned off. The reason for feeding the input signal into the left one of the two enabled delay chain elements is to "precharge" that delay chain element with the current state of the input signal. In that way, if the delay control signal SHF[0:35] is updated to increase the signal delay by one delay element, a smooth transition is provided to the increased delay time.

When none of the bits of the input bus SHF[0:5] are high, the transmission gate 607 of every chain delay element 603 is on. The input signal comes into node IN 601 and goes through all the chain delay element to reach output node OUT 602.

Since the value of the input bus SHF[0:5] 604 determines where on the delay line the input signal on node 307 is inserted, the value on the delay control bus SHF[0:5] 604 is processed in the sub-chain blocks and output to node Y 605 to control which sub-chain or sub-chains actually receive the delay input signal on node CHIN 606.

The delay input signal on node CIN 307 goes into the delay chain block CHAIN 308. Where in the delay chain the CIN signal is inserted is determined by the output of the block SLIDER 327 on the delay control bus SHF[0:35] 315. After the CIN signal goes through the desired number of chain delay elements (so as to delay the ClN-signal by a desired amount of time), this signal is transformed by the CHAIN circuit into four window signals. A shifting right window signal is generated on node SR 317 by sending the delayed CIN signal through one window delay element. Then this signal goes through two window delay elements to form a center enabling window on node ENA 314 and another window delay element to form a shifting left window on node SL 316. Together, by adding the shifting right window, the center enabling window and the shifting left window, an enabling window on node EN 309 is formed.

SLIDER Circuit Block

Referring to FIGS. 3, 7, 8, 10 and 11, the SLIDER circuit block 327 is a multi-bit right/left shift register. The two right most bits are initially set to 1 whenever the RST signal is asserted. While the shift register has thirty-six bits in the preferred embodiment, the number of bits will vary from one implementation to another. The shift register uses D-type flip-flops 704 as its memory elements. All but two of the flip-flops have a low active reset pin, and those two each have a low active set pin. Each flip-flop 704 has a two-to-one multiplexer MUX 703 that is used to feed the data either from its right neighbor flip-flop or from its left neighbor flip-flop into its data input port D. The MUX 703 is controlled by a mux control signal on node RL 328. The two right most flip-flops 701 and 702 are D-type flip-flops with a low active set pin. When the reset node RST 311 is asserted, flip-flops 701 and 702 are set to a 1 value. All other flip-flops 704 in the shift register are reset to a 0 value by the RST signal. For each clock pulse that comes into node CKSLI 326, the shift register shifts its data contents one position to the right when the signal on node RL 328 is high and shifts its data contents one position to the left when the signal on node RL 328 is low. The data contents of the shift register SLIDER 327 are output onto the delay control bus SHF[0:351] 315.

Operation of the Clock and Data Recovery System

In order to properly initialize the clock and data recovery system, a certain synchronization pattern at the beginning of each received data frame (often called a data packet) is required. In the preferred embodiment, each received data frame or packet begins with a synchronization data pattern of at least 36 bits having a 1 0 1 0 1 0 1 0 . . . data pattern, chosen due to the fact that this pattern in Manchester or other bi-phase level coding does not contain any unwanted returning transitions. This pattern contains only informational transitions. The synchronization pattern of 1 0 1 0 1 0 1 0 . . . preceding the pay load data is called a preamble, which is widely used in Manchester and other bi-phase level encoded data frames to help the clock and data recovery system to establish synchronization with the incoming data stream. In the present invention, according to the operating frequency, there is a minimum number of preamble bits required to synchronize the enabling window of the clock and data recovery system with the incoming data stream.

Referring to FIGS. 3, 8, 9,10 and 11, the Manchester encoded serial data stream comes into the node SERIN 301. For every transition on node SERIN 301, the FRONT circuit block 302 generates a corresponding positive pulse on node CK1 303.

At the beginning of each data frame or packet, a positive reset pulse is generated so as to put the entire clock and data recovery system into a known state. The chain input selection R-S latch 313 is reset so as to assert a low signal on node CS 310. The CS signal is, in effect, the mode signal for the clock and data recover circuit. When the CS signal is low, the circuit is in the "prelock" mode, and when the CS signal is high the circuit is in the "lock" mode.

The chain input selection MUX 306 is initially (i.e., when CS is low) set to pass the signal on node CK1 303. The slider input selection MUX 324, which determines the signal used to clock the SLIDER circuit 327, is initially set to pass the signal on node CK1 303. Initially, the Chain circuit's input signal on node CIN 307 is equivalent to the signal on node CK1 303. The Chain circuit block 308 therefore initially utilizes the CK1 signal from node 303 to generate the enabling window on node EN 309.

The positions of the enabling windows relative to the informational transitions are determined by the value on bus SHF[0:35] 315. After the reset pulse the two right most bits of the shift register of the block SLIDER 327 are set to 1, and thus the two most significant bits SHF[34] and SHF[35] are set to high. This sets the delay CHAIN circuit 308 to its shortest delay path. The overall design of the clock and data recovery system guarantees that the shortest delay path is shorter than one data bit time. The reset pulse also sets the slider direction control R-S latch 329 to output a low signal on node RL 328. The low voltage level on node RL 328 indicates that the shift register of the block SLIDER 327 is to shift left on each clock pulse on node CKSLI 326. During circuit synchronization, the clock pulses on node CKSLI 326 are a delayed and strengthened version of the clock pulses on node CK1 303. The clock buffers 325 increase the driving strength of the clock signal output of the slider input selection MUX 324.

As the two delay control bits are shifted left in the SLIDER shift register 327, the enabling window generated by the Chain circuit block shifts to the right (i.e., to greater delays) relative to the received data signal. Conversely, as the two delay control bits are shifted right in the SLIDER shift register 327, the enabling window generated by the Chain circuit block shifts to the left (i.e., to lesser delays) relative to the received data signal. Since the delay is initially set to its minimum value, the SLIDER shift register is initialized to shift left and thereby shift the enabling window to the right until the clock pulses on node CK1 303 overlap with the center enabling window on node ENA 314. Once this happens, the chain input selection R-S latch 313 is set so that its output on node CS 310 is high, shifting the clock and data recovery circuit to its lock mode of operation. The chain input selection MUX 306, which is controlled by the CS signal, thereafter passes the recovered clock pulses on node CKOUT 305, and the slider input selection MUX 324, which is also controlled by the CS signal, passes the shifting right or shifting left clock pulses from node CKRL 323. After the CS 310 signal is set high, the enabling window is formed by the recovered clock pulse one data bit time proceeding the current one.

When the CS signal is set high, the initialization process is finished. The useful data bits following the preamble bits are recovered using the enable window as positioned during initialization. The position of the enable window is automatically adjusted during data recovery if any adjustment is required.

As long as any jitter in the incoming serial data stream on node SERIN 301 is less than half the width of the center enabling window on node ENA 314, there is no need to adjust the relative position of the enabling window on node EN 309 once it is centered on the average mid-position of the bit cells. The process of centering the middle enabling window ENA (node 314) on the middle of the bit cells will sometimes continue after the initialization process is finished, but typically during the normal operational mode, during the large majority of bit frames most of the circuits shown in FIG. 3 stay quiet and do not consume any power.

There are cases when the enabling window on node EN 309 drifts from the ideal positions relative to the rising edge of the recovered clock on node CKOUT 305. Specifically, when the rising edge of the recovered clock is out of the range of the center enabling window ENA as shown in FIGS. 10 and 11, the position of the enabling window needs to be adjusted.

The drifting of the enabling window relative to the bit cells can be caused either by jitter in the incoming serial data stream or by changes in the physical environment of the data receiving and/or transmitting system. Examples of the physical environment changes can be power supply voltage variations, surrounding temperature variations, and so on.

When the rising edge of the recovered clock on node CKOUT 305 is outside and on the left of the center enabling window on node ENA 314, the enabling window should be shifted towards the left direction as shown in FIG. 10. For every rising edge of the recovered clock within the range of the shifting right window on node SR 317, the phase lockup comparator 319 generates a negative pulse on node SETRZ 321 and sets the slider direction control R-S latch's 329 output to high. Meanwhile the negative pulse on node SETRZ 321 also generates a positive clock pulse on node CKSLI 326. The two high bits in the shift register of block SLIDER 327 shifts towards the right direction by one bit. This change is reflected by changing the value on the delay control bus SHF[0:35]. The net effect of the shifting right action is that one chain delay element is removed from the signal delay path inside block CHAIN 308. The effective delay chain becomes shorter than before. This process continues until the rising edge of the recovered clock is inside the center enabling window ENA.

The phase lockup comparator 319 works as follows. The falling edge of the shifting right window on node SR 317 is compared against the rising edge of the recovered clock on node CKOUT 305. When the falling edge of the shifting right window on node SR 317 is lagging behind the rising edge of the recovered clock on node CKOUT 305, the output of the phase lockup comparator 319 on node SETRZ 321 goes low.

The falling transition of the recovered clock signal on node CIN 307 triggers the one shot generator 312 to produce a positive pulse on node 320. The positive pulse resets the phase lockup comparator 319. Therefore the level on node SETRZ is reset back to high shortly after the data transition within each bit cell. When the falling edge of the shifting right window on node SR 317 lags behind the rising edge of the recovered clock on node CKOUT 305, a complete negative going pulse on node SETRZ 321 is generated. When the falling edge of the shifting right window on node SR 317 is leading the rising edge of the recovered clock on node CKOUT 305, the output of the phase lockup comparator 319 on node SETRZ 321 remains unchanged and thus no pulse is generated.

When the rising edge of the recovered clock on node CKOUT 305 is outside and on the right of the center enabling window on node ENA 314, the enabling window should be shifted towards the right direction as shown in FIG. 11. For every rising edge of the recovered clock within the range of the shifting left window on node SL 316, the phase lockup comparator 318 generates a negative pulse on node SETLZ 322 and sets the slider direction control R-S latch's 329 output to low. Meanwhile, the negative pulse on node SETLZ 322 also generates a positive clock pulse on node CKSLI 326. The two high bits in the shift register of block SLIDER 327 are shifted in the left direction by one bit. This change is reflected by changing the value on the delay control bus SHF[0:35]. The net effect of the shifting left action is that one chain delay element is added into the signal delay path inside block CHAIN 308. The effective delay chain becomes longer than before. This process continues until the rising edge of the recovered clock appears inside the center enabling window ENA.

The above circuits also work for a bi-phase level coded serial data stream (as represented by trace 101b), the only difference being that the recovered data needs to be inverted.

While the present invention has been described with reference to a few specific embodiments, the description is illustrative of the invention and is not to be construed as limiting the invention. Various modifications may occur to those skilled in-the art without departing from the true spirit and scope of the invention as defined by the appended claims.

What is claimed is:

1. A data and clock recovery circuit, comprising:

a front end circuit for receiving a data signal encoded with a Manchester or other bi-phase level code having a sequence of bit frames, and for outputting a recovered data signal and a recovered clock signal in accordance with transitions in the data signal that overlap with a window signal;

a window generation circuit for generating the window signal in accordance with a delay control signal, including circuitry that delays and transforms the recovered clock signal into the window signal;

a delay control circuit that generates and adjusts the delay control signal; and a phase comparison circuit that compares the recovered clock signal with leading and lagging portions of the window signal, and for generating signals that adjust the delay control signal when the recovered clock signal overlaps with either of the leading and lagging portions of the window signal, the delay control signal being adjusted so as to re-position the window signal so that recovered clock signal is positioned between the leading and lagging portions of the window signal.

2. The data and clock recovery circuit of claim 1, wherein the delay control circuit includes a shift register having a multiplicity of sequentially connected data storage elements having respective output signals that collectively compose the delay control signal, the shift register including connections for initializing the data storage elements so as to store and output a predefined delay control signal value upon receipt of a predefined reset signal, connections for shifting the control signal value stored the data storage elements in a first direction when the phase comparison circuit detects that the recovered clock signal overlaps the leading portion of the window signal and for shifting the control signal value stored the data storage elements in a second direction, opposite the first direction, when the phase comparison circuit detects that the recovered clock signal overlaps the lagging portion of the window signal.

3. The data and clock recovery circuit of claim 2, wherein the delay control signal comprises a set of N delay control subsignals;

the front end circuit includes a pulse generator that generates a pulse for each signal level transition in the received data signal; and the window generation circuit includes a delay chain having an output, at least N data insertion ports and at least N corresponding data insertion devices, each data insertion device inserting into the delay chain at least a subset of the pulses generated by the front end circuit when a corresponding one of the N delay control subsignals is enabled; the window generation circuit further including logic circuitry coupled to the delay chain output for generating the window signal.

4. The data and clock recovery circuit of claim 1, wherein the received data signal comprises a sequence of data packets, each data packet beginning with a predefined synchronization data pattern;

the data and clock recovery circuit has a prelock mode of operation and a lock mode of operation, wherein during the prelock mode the delay control circuit initially generates the delay control signal with a predefined initial delay control signal value and then, in conjunction with the phase comparison circuit monotonically adjusts the delay control signal value until the recovered clock signal is positioned between the leading and lagging portions of the window signal, at which point the data and clock recovery circuit changes to the lock mode of operation.

5. A method of recovering data from a data signal encoded with a Manchester or other bi-phase level code having a sequence of bit frames, comprising the steps of:

receiving the data signal and generating a recovered data signal and a recovered clock signal in accordance with transitions in the data signal that overlap with a window signal;

generating a delay control signal;

generating the window signal from the recovered clock signal in accordance with the delay control signal;

comparing the recovered clock signal with leading and lagging portions of the window signal; and when the recovered clock signal overlaps with either of the leading and lagging portions of the window signal, adjusting the delay control signal so as to re-position the window signal so that recovered clock signal is positioned between the leading and lagging portions of the window signal.

6. The method of claim 5, the delay control signal generating and adjusting steps including:

initializing a set of interconnected data storage elements forming a shift register, the data storage elements having respective output signals that collectively compose the delay control signal, the data storage elements being initialized so as to store and output a predefined delay control signal value upon receipt of a predefined reset signal; and shifting the control signal value stored the data storage elements in a first direction when the recovered clock signal overlaps the leading portion of the window signal and shifting the control signal value stored the data storage elements in a second direction, opposite the first direction, when the recovered clock signal overlaps the lagging portion of the window signal.

7. The method of claim 6, wherein the delay control signal comprises a set of N delay control subsignals;

the recovered data signal and clock signal generating step including generating a pulse for each signal level transition in the received data signal; and the window signal generating step including providing a delay chain having an output, at least N data insertion ports and at least N corresponding data insertion devices, each data insertion device inserting into the delay chain at least a subset of the generated pulses when a corresponding one of the N delay control subsignals is enabled, and performing delay and logic operations on signals produced at the delay chain output so as to generate the window signal.

8. The method of claim 5, wherein the received data signal comprises a sequence of data packets, each data packet beginning with a predefined synchronization data pattern;

at or before the beginning of each data packet, establishing a prelock mode of operation in which the delay control signal is initialized to a predefined initial delay control signal value that is then monotonically adjusted until the recovered clock signal is positioned between the leading and lagging portions of the window signal, and then establishing a lock mode of operation in which the delay control signal value is adjusted in either of two directions, as needed to re-position the window signal until the recovered clock signal is positioned between the leading and lagging portions of the window signal.

* * * * *